(12) United States Patent
Fornage

(10) Patent No.: US 8,837,178 B2
(45) Date of Patent: Sep. 16, 2014

(54) METHOD AND APPARATUS FOR SINGLE-PATH CONTROL AND MONITORING OF AN H-BRIDGE

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 709 days.

(21) Appl. No.: 12/803,890

(22) Filed: Jul. 8, 2010

(65) Prior Publication Data

US 2011/0007537 A1 Jan. 13, 2011

Related U.S. Application Data

(60) Provisional application No. 61/270,545, filed on Jul. 9, 2009.

(51) Int. Cl.
*H02M 1/32* (2007.01)
*H02M 7/5387* (2007.01)

(52) U.S. Cl.
USPC ........................................ 363/56.02

(58) Field of Classification Search
CPC . H02M 1/32; H02M 7/5387; H02M 2001/32; H02M 2007/5387
USPC .................. 363/131–134, 15–17, 24–28, 37, 363/40–41, 55, 56.01–56.08, 97–98
See application file for complete search history.

(56) References Cited

U.S. PATENT DOCUMENTS

| 4,904,904 | A | * | 2/1990 | Zarate | 315/219 |
| 4,967,332 | A | | 10/1990 | Claydon et al. | |
| 5,192,897 | A | * | 3/1993 | Vossough et al. | 315/308 |
| 6,094,017 | A | * | 7/2000 | Adamson | 315/307 |
| 6,111,732 | A | * | 8/2000 | Beland | 361/42 |
| 6,181,076 | B1 | | 1/2001 | Trestman et al. | |
| 7,173,467 | B2 | | 2/2007 | Liu | |
| 8,040,161 | B2 | * | 10/2011 | Yanagishima et al. | 327/108 |
| 2005/0041444 | A1 | * | 2/2005 | Inoue | 363/56.02 |
| 2007/0080651 | A1 | | 4/2007 | Hu et al. | |
| 2007/0159866 | A1 | | 7/2007 | Siri | |
| 2007/0216377 | A1 | * | 9/2007 | Yoshimura | 323/250 |

FOREIGN PATENT DOCUMENTS

WO WO 2010/062662 A2 6/2010

OTHER PUBLICATIONS

International Search Report and Written Opinion mailed Jan. 28, 2011 for PCT Application No. PCT/US2010/041341.
Ken Dierberger, "A New Generation of Power MOSFET Offers Improved Performance at Reduced Cost", Advanced Power Technology®, APT9703 Application Note, Printed—Dec. 1997, pp. 1-12.

* cited by examiner

*Primary Examiner* — Gary L Laxton
(74) *Attorney, Agent, or Firm* — Moser Taboada

(57) ABSTRACT

A method and apparatus for controlling and monitoring an H-bridge via a single communication path. The apparatus comprises a first control and monitor module coupled to a first switch within the H-bridge; and a first pulse transformer coupled to a first control signal to the first control and monitor module, wherein the first control and monitor module (i) generates, based on the first control signal, a first driver signal for operating a first switch of the H-bridge during DC/AC power conversion, (ii) monitors at least a portion of the H-bridge for at least one fault, and (iii) communicates, upon detecting the at least one fault, a first fault indication to a main controller of the H-bridge via the first pulse transformer.

20 Claims, 7 Drawing Sheets

METHOD AND APPARATUS FOR SINGLE-PATH CONTROL AND MONITORING OF AN H-BRIDGE

CROSS-REFERENCE TO RELATED APPLICATIONS

This application claims benefit of U.S. provisional patent application Ser. No. 61/270,545, filed Jul. 9, 2009, which is herein incorporated in its entirety by reference.

BACKGROUND OF THE INVENTION

1. Field of the Invention

Embodiments of the present disclosure generally relate to power conversion and, more particularly, to a method and apparatus for monitoring and controlling DC/AC power conversion.

2. Description of the Related Art

A common topology for a DC/AC power conversion module (i.e., a DC/AC inverter) is to employ a DC/DC booster stage followed by an H-bridge. The DC/DC booster stage generates a rectified sine-wave output and the H-bridge, operating at the frequency of an AC line coupled to the output of the DC/AC inverter, creates a true AC waveform by "unfurling" the rectified sine-wave from the DC/DC booster stage. In some instances, the AC output from the DC/AC inverter may be coupled to a commercial AC power line. For example, solar power generation systems utilizing DC/AC inverters convert DC power produced by photovoltaic modules to AC power that may be coupled to the commercial AC power grid.

In order to generate the required AC waveform output, the DC/AC inverter generally receives control signals from a controller via a control signal path for operating the H-bridge, i.e., for alternately switching the diagonals of the H-bridge on and off. Additionally, the DC/AC inverter generally provides one or more monitoring signals back to the controller via a monitoring signal path. The monitoring signals indicate any fault occurrences in the H-bridge and trigger the controller to shut-down the DC/DC booster stage and the H-bridge to prevent any damage in such a situation. Such control and monitoring signal paths require additional components and connections within the power conversion module and consume additional space within the power conversion module.

Therefore, there is a need for a method and apparatus for providing control signals to an H-bridge and receiving monitoring signals from the H-bridge utilizing a single communication path.

SUMMARY OF THE INVENTION

Embodiments of the present invention generally relate to a method and apparatus for controlling and monitoring an H-bridge via a single communication path. The apparatus comprises a first control and monitor module coupled to a first switch within the H-bridge; and a first pulse transformer coupled to a first control signal to the first control and monitor module, wherein the first control and monitor module (i) generates, based on the first control signal, a first driver signal for operating a first switch of the H-bridge during DC/AC power conversion, (ii) monitors at least a portion of the H-bridge for at least one fault, and (iii) communicates, upon detecting the at least one fault, a first fault indication to a main controller of the H-bridge via the first pulse transformer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
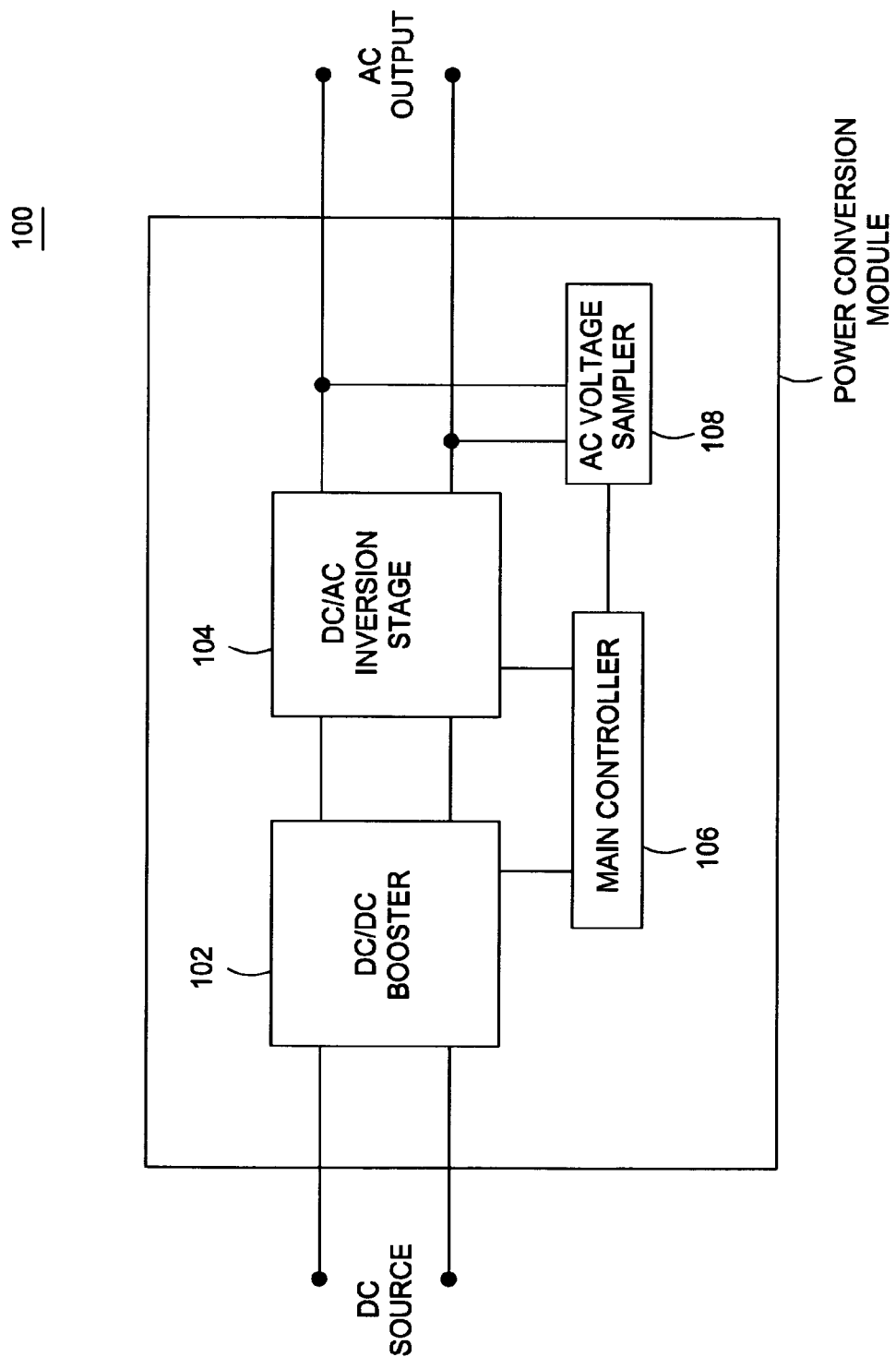
FIG. 1 is a block diagram of a power conversion module in accordance with one or more embodiments of the present invention.

FIG. 1 is a block diagram of a power conversion module 100 in accordance with one or more embodiments of the present invention. The power conversion module 100 receives DC input power from a DC source and produces AC output power. In some embodiments, the power conversion module 100 receives the DC input power from one or more solar powered photovoltaic (PV) module(s); alternatively, the power conversion module 100 may receive the DC input power from any suitable DC power source. The power module 100 converts the DC power into AC power that may be coupled to a commercial AC power grid ("power grid"), coupled to one or more appliances, and/or stored for later use (e.g., utilizing batteries, heated water, hydro pumping, $H_2O$-to-hydrogen conversion, or the like).

The power conversion module 100 comprises a DC/DC booster 102, a DC/AC inversion stage 104, a main controller 106, and an AC voltage sampler 108. The DC/DC booster 102 is coupled via two input terminals to the DC power source and via two output terminals to the DC/AC inversion stage 104; the DC/DC booster 102 is further coupled to the main controller 106. The DC/DC booster 102 converts the DC input power to a DC output power (i.e., a rectified sine wave output) in accordance with DC/DC conversion control signals received from the main controller 106. The output power from the DC/DC booster 102 is coupled to the DC/AC inversion stage 104.

The DC/AC inversion stage 104 is coupled to the main controller 106 and converts the DC power from the DC/DC booster 102 to AC power in accordance with DC/AC conversion control signals received from the main controller 106. The AC power from the DC/AC inversion stage 104 is coupled to an AC line, for example, the power grid. The AC voltage sampler 108 is coupled to the two output terminals of the DC/AC inversion stage 104 and to the main controller 106. The AC voltage sampler 108 provides samples of the AC line voltage to the main controller 106 for generating the power conversion control signals.

In accordance with one or more embodiments of the present invention, the main controller 106 provides control signals to the DC/AC inversion stage 104 and receives monitoring signals from the DC/AC inversion stage 104 via a single communication path, as described in detail below.

Figure 2:
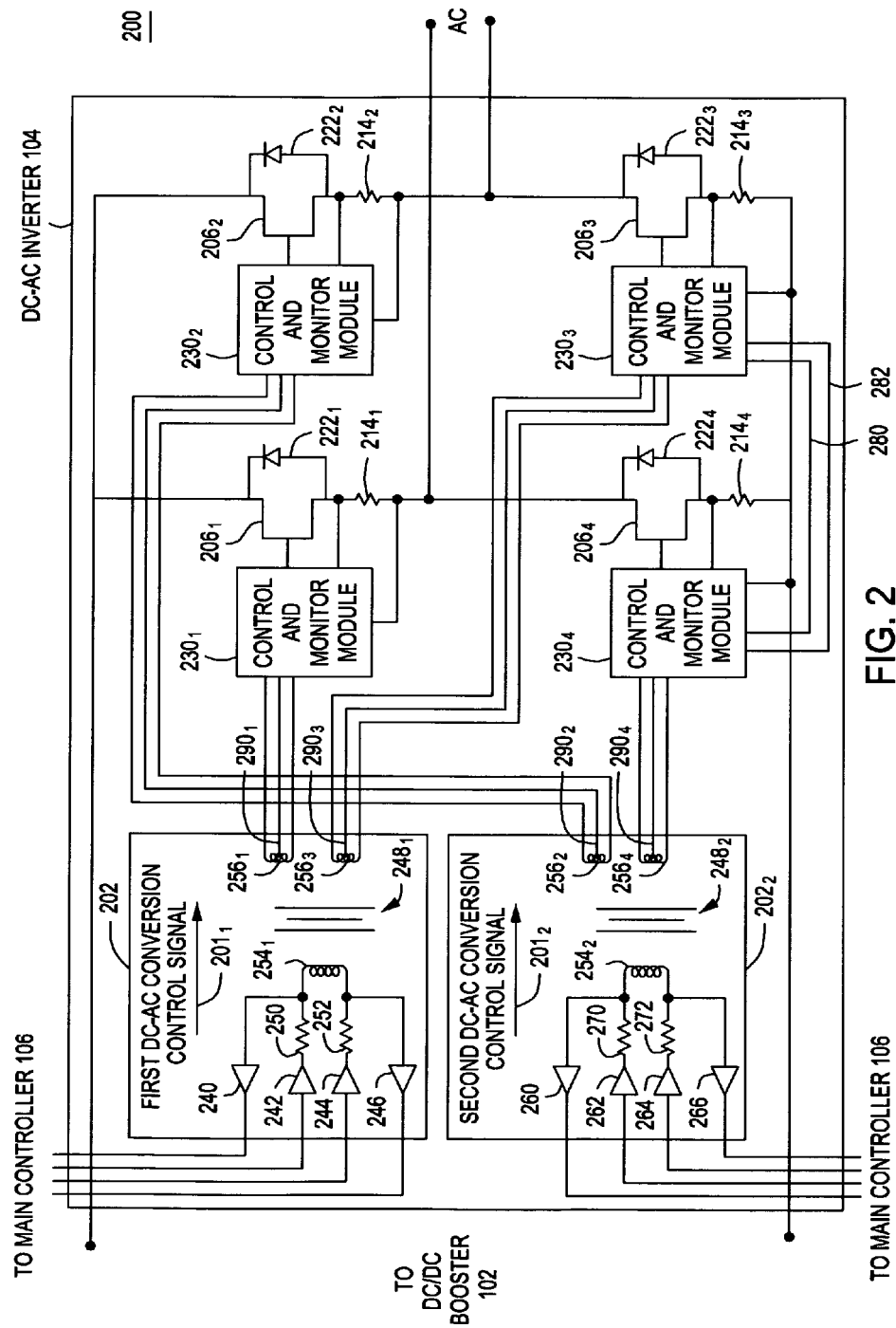
FIG. 2 is a schematic diagram of a DC/AC inversion stage in accordance with one or more embodiments of the present invention.

FIG. 2 is a schematic diagram of a DC/AC inversion stage 104 in accordance with one or more embodiments of the present invention. The DC/AC inversion stage 104 comprises coupler modules $202_1$ and $202_2$ (collectively referred to as coupler modules 202), n-type MOSFET switches $206_1$, $206_2$, $206_3$, and $206_4$ (collectively referred to as switches 206), resistors $214_1$, $214_2$, $214_3$, and $214_4$ (collectively referred to as resistors 214), diodes $222_1$, $222_2$, $222_3$, and $222_4$, (collectively referred to as diodes 222), and control and monitor modules $230_1$, $230_2$, $230_3$, and $230_4$ (collectively referred to as control and monitor modules 230). In alternative embodiments, one or more of the switches 206 may be an insulated gate bipolar transistor (IGBT), a gate turn-off (GTO) switch, a bipolar junction transistor (BJT), or the like, or some combination thereof.

The coupler modules $202_1$ and $202_2$ operate to couple control signals from the main controller 106 to the control and monitor modules 230 and also to couple fault indications from the control and monitor modules 230 to the main controller 106. The coupler module $202_1$ comprises a pulse transformer $248_1$ and buffers 240, 242, 244, and 246. The pulse transformer $248_1$ comprises a primary winding $254_1$ and two identical secondary windings, $256_1$ and $256_3$, where each secondary winding $256_1$ and $256_3$ comprises a tap $290_1$ and $290_3$, respectively. An output terminal of the buffer 242 is coupled to a first terminal of a resistor 250; a second terminal of the resistor 250 is coupled to an input terminal of the buffer 240 and a first terminal of the primary winding $254_1$. An output terminal of the buffer 244 is coupled to a first terminal of a resistor 252; a second terminal of the resistor 252 is coupled to an input terminal of the buffer 246 and to a second terminal of the primary winding $254_1$. Output terminals of the buffers 240 and 246 and input terminals of the buffers 242 and 244 are coupled to the main controller 106. The secondary windings $256_1$ and $256_3$, including their respective taps $290_1$ and $290_3$, are coupled to control and monitor modules $230_1$ and $230_3$, respectively.

The coupler module $202_2$ comprises a pulse transformer $248_2$ and buffers 260, 262, 264, and 266. The pulse transformer $248_2$ comprises a primary winding $254_2$ and two identical secondary windings, $256_2$ and $256_4$, where each secondary winding $256_2$ and $256_4$ comprises a tap $290_2$ and $290_4$, respectively. An output terminal of the buffer 262 is coupled to a first terminal of a resistor 270; a second terminal of the resistor 270 is coupled to an input terminal of the buffer 260 and a first terminal of a primary winding $254_2$. An output terminal of the buffer 264 is coupled to a first terminal of a resistor 272; a second terminal of the resistor 272 is coupled to an input terminal of the buffer 266 and to a second terminal of the primary winding $254_2$. Output terminals of the buffers 260 and 266 and input terminals of the buffers 262 and 264 are coupled to the main controller 106. The secondary windings $256_2$ and $256_4$, including their respective taps $290_2$ and $290_4$, are coupled to control and monitor modules $230_2$ and $230_4$, respectively. In some alternative embodiments, the secondary windings 256 may each be a single winding transformer rather than a tapped transformer, as described below with respect to FIG. 7.

The switches 206 are coupled in an H-bridge configuration with switches $206_1$ and $206_3$ forming a first diagonal of the H-bridge and switches $206_2$ and $206_4$ forming a second diagonal of the H-bridge. A drain terminal of the switch $206_1$ is coupled to a first output terminal of the DC/DC booster 102, and a source terminal of the switch $206_1$ is coupled to a first terminal of the resistor $214_1$. A second terminal of the resistor $214_1$ is coupled to a first output terminal of the DC/AC inversion stage 104 and to a drain terminal of the switch $206_4$. A source terminal of the switch $206_4$ is coupled to a first terminal of the resistor $214_4$, and a second terminal of the resistor $214_4$ is coupled to a second output terminal of DC/DC booster 102.

A drain terminal of the switch $206_2$ is coupled to the first output terminal of the DC/DC booster 102, and a source terminal of the switch $206_2$ is coupled to a first terminal of the resistor $214_2$. A second terminal of the resistor $214_2$ is coupled to a second output terminal of the DC/AC inversion stage 104 and to a drain terminal of the switch $206_3$. A source terminal of the switch $206_3$ is coupled to a first terminal of the resistor $214_3$, and a second terminal of the resistor $214_3$ is coupled to the second output terminal of DC/DC booster 102.

The diodes $222_1$, $222_2$, $222_3$, and $222_4$ are each coupled across the switches $206_1$, $206_2$, $206_3$, and $206_4$, respectively, such that each diode anode terminal is coupled to the corresponding switch source terminal and each diode cathode terminal is coupled to the corresponding switch drain terminal; in some embodiments, the diodes 222 are an integral part of the switches 206.

The control and monitor modules 230 are coupled to the H-bridge for controlling the operation of the H-bridge (i.e., activating and deactivating the switches 206) and monitoring the H-bridge for fault conditions. In the event of a detected fault condition, the control and monitor modules 230 drive the H-bridge to shut-down such that no current passes through any of the H-bridge switches. In some embodiments, the control and monitor modules 230 are low-voltage integrated circuits (ICs).

The control and monitor modules $230_1$, $230_2$, $230_3$, and $230_4$ are coupled in a one-to-one correspondence to the gate and source terminals of the switches $206_1$, $206_2$, $206_3$, and $206_4$, respectively. Additionally, the control and monitor modules $230_1$, $230_2$, $230_3$, and $230_4$ are coupled in a one-to-one correspondence to the second terminals of the resistors $214_1$, $214_2$, $214_3$, and $214_4$, respectively. The control and monitor modules $230_1$, $230_2$, $230_3$, and $230_4$ are coupled to the secondary windings $256_1$, $256_2$, $256_3$, and $256_4$, respectively, for receiving control signals from the main controller 106 and providing fault indications to the main controller 106. Additionally, the control and monitor modules $230_3$, and $230_4$ are coupled together via two lines (i.e., lines 280 and 282) for communicating detected fault conditions to one another.

During normal operating conditions (i.e., no fault conditions), the control and monitor modules 230 drive the switches 206 in accordance with DC/AC conversion control signals 202 from the main controller 106. During such operation, the diagonal switch pairs $206_1/206_3$ and $206_2/206_4$ are sequentially activated and deactivated to convert DC power from the DC/DC booster 102 to AC power at the output of the DC/AC inversion stage 104. The diagonal switch pairs $206_1/206_3$ and $206_2/206_4$ each conducts current for half of an AC line voltage cycle and operate in a mutually exclusive fashion; i.e., each diagonal switch pair is on or off during the opposite half-cycle from the other diagonal switch pair. In some embodiments, the resulting AC power from the DC/AC inversion stage 104 is synchronously coupled to the commercial power grid. In some alternative embodiments, the switches 206 may be driven at higher frequencies (e.g., tens of kilohertz and higher) for alternative applications, such as for a DC/DC converter.

In order to drive the sequential switching of the diagonal switch pairs, the main controller 106 applies a first DC/AC conversion control signal $201_1$ via the pulse transformer $248_1$ to the control and monitor modules $230_1$ and $230_3$ and a second DC/AC conversion control signal $201_2$ via the pulse transformer $248_2$ to the control and monitor modules $230_2$ and $230_4$. The control and monitor modules 230 drive the corresponding switches 206 in accordance with the DC/AC conversion control signals 201. In some embodiments, the secondary windings 256 may be such that the magnitude of the DC/AC conversion control signal 201 is stepped-up on the secondary side of the pulse transformer; for example, a step-up may be required to increase from 3.3V logic to 10V for operating a MOSFET switch. In some alternative embodiments, the secondary windings 256 may be such that no change in voltage level occurs or the voltage level is stepped-down on the secondary side of the pulse transformer 248.

The first and second DC/AC conversion control signals $201_1$, $201_2$ comprise high-frequency (e.g., on the order of megahertz) periodic dual-polarity pulses that drive the operation of the switches 206 in accordance with their duty cycle. By operating at such high frequencies (e.g., at frequencies much higher than the frequency of the power grid), relatively small and cost effective pulse transformers 248 may be utilized. In some embodiments, the DC/AC conversion control signals 201 drive the corresponding control and monitor modules 230 to turn on the subtending switches 206 when the DC/AC conversion control signal duty cycle is greater than 50% and to turn off the subtending switches 206 when the DC/AC conversion control signal duty cycle is less than 50%. For example, the DC/AC conversion control signals $201_1$ and $201_2$ may each comprise a periodic series of pulses having a 75% duty cycle ("three-quarters pulse") and a periodic series of pulses having a 25% duty cycle ("one-quarter pulse"), where the three-quarters pulse signal drives the corresponding downstream switches 206 in an on-state and the one-quarter pulse signal drives the corresponding downstream switches 206 in an off-state. One embodiment of a DC/AC conversion control signal 201 is described below with respect to FIG. 5.

In addition to controlling the H-bridge functionality during normal operating conditions, the control and monitor modules 230 monitor for one or more fault conditions, such as excessive current flowing through the switches 206 (i.e., overcurrent), large negative current flowing through the switches 206, under-voltage lockout (UVLO) (i.e., insufficient power for operating the control and monitor module 230), over-temperature faults, or the like. When a fault condition is detected by a control and monitor module 230, the control and monitor module 230 deactivates its subtending switch 206 and may trigger one or more of the remaining control and monitor modules 230 to deactivate their corresponding switch 206. Additionally, the control and monitor module 230 detecting the fault provides a fault indicator signal back to the main controller 106 via the corresponding secondary winding 256; i.e., the fault indicator signal from the control and monitor module 230 to the main controller 106 utilizes the same communication path as the control signals from the main controller 106 to the control and monitor module 230. The fault indicator signal triggers the main controller 106 to deactivate all of the switches 206.

Figure 3:
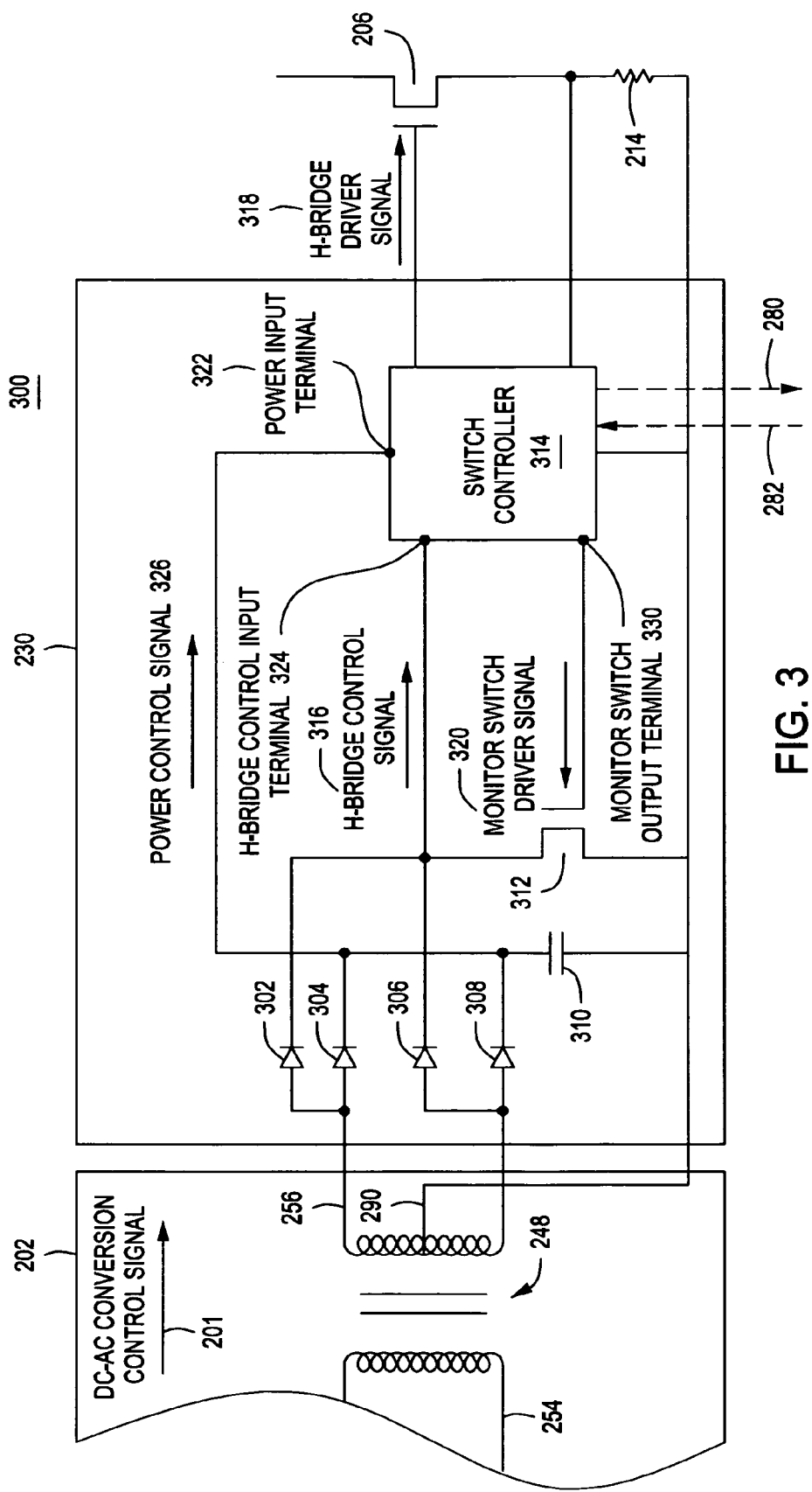
FIG. 3 is a schematic diagram of a control and monitor module in accordance with one or more embodiments of the present invention.

FIG. 3 is a schematic diagram of a control and monitor module 230 in accordance with one or more embodiments of the present invention. The control and monitor module 230 comprises diodes 302, 304, 306, and 308; an input capacitor 310; a MOSFET monitor switch 312; and a switch controller 314. In some alternative embodiments, the monitor switch 312 may be a switch such as an insulated gate bipolar transistor (IGBT), a gate turn-off (GTO) switch, a BJT, or the like, or some combination thereof.

Anode terminals of the diodes 302 and 304 are coupled to a first terminal of the secondary winding 256 of coupler module 202, and anode terminals of the diodes 306 and 308 are coupled to a second terminal of the secondary winding 256. Cathode terminals of the diodes 304 and 308 are coupled to a first terminal of the input capacitor 310 and to a power input terminal 322 of the switch controller 314 for providing power to the switch controller 314; in some embodiments, the switch controller 314 may be on the order of a 10 volt or 15 volt integrated circuit (IC). Cathode terminals of the diodes 302 and 306 are coupled to a drain terminal of the monitor switch 312 and to an H-bridge control input terminal 324 of the switch controller 314 for providing an H-bridge control signal 316 to the switch controller 314. A second terminal of the input capacitor 310, a source terminal of the monitor switch 312, and the switch controller 314 are further coupled to the tap 290 of the secondary winding 256 and to the second terminal of the resistor 214. The switch controller 314 is further coupled to the first terminal of the resistor 214, the gate terminal of the switch 206, and the gate terminal of the monitor switch 312. Additionally, the switch controller 314 of the control and monitor module $230_3$ is coupled to a switch controller 314 of the control and monitor module $230_4$.

The secondary winding 256 provides an input signal to the control and monitor module 230 based on the DC/AC conversion control signal 201 supplied by the main controller 106 to the primary winding 254. The diodes 304 and 308 rectify the DC/AC input signal received from the secondary winding 256 and couple the resulting power control signal 326 to the input capacitor 310 and to the power input terminal 322. When the power control signal 326 has a high value, the power control signal 326 provides power to the switch controller 314 and provides a positive voltage across the input capacitor 310 (i.e., each pulse of the power control signal 326 provides a positive voltage across the first and second terminals of the input capacitor 310). When the power control signal 326 has a low value, the input capacitor 310 discharges to provide power to the switch controller 314. Thus, the diodes 304, 308 and the capacitor 310 form a DC power source for the switch controller 314.

The diodes 302 and 306 rectify the input signal received from the secondary winding 256 and couple the resulting H-bridge control signal 316 to the H-bridge control input terminal 324 and to the drain terminal of the monitor switch 312; one embodiment of the H-bridge control signal 316 is described below with respect to FIG. 5. During normal operating conditions (i.e., no fault conditions), the switch controller 314 generates an H-bridge driver signal 318 that drives the switch 206 in accordance with the duty cycle of the H-bridge control signal 316; for example, the switch 206 is activated when the H-bridge control signal duty cycle is greater than 50% and deactivated when the H-bridge control signal duty cycle is less than 50%. Additionally during normal operating conditions, the switch controller 314 generates a monitor switch driver signal 320 for maintaining the monitor switch 312 in an off-state.

The switch controller 314 monitors for one or more fault conditions, such as excessive current flowing through the switch 206 (i.e., overcurrent), large negative current flowing through the switch 206, under-voltage lockout (UVLO), over-temperature faults, or the like. When a fault condition is detected by the switch controller 314, the switch controller 314 generates an H-bridge driver signal 318 that deactivates the switch 206, prohibiting current flow through the switch 206. Additionally, the switch controller 314 generates a monitor switch driver signal 320 such that the monitor switch 312 is alternately activated and deactivated based on the H-bridge control signal 316. In some embodiments, the monitor switch driver signal 320 activates the monitor switch 312 after 25% of the period of the H-bridge control signal 316 and deactivates the monitor switch 312 at the end of each period of the H-bridge control signal 316. Such operation of the monitor switch 312 periodically shorts the H-bridge control input terminal 324, thereby "clamping" the switch control signal 316 and the DC/AC conversion control signal 201 at a 25% duty cycle. Such clamping of the switch control signal 316 and the DC/AC conversion control signal 201 provides a fault indicator signal back to the main controller 106 via the pulse transformer 248 and additionally causes the control and monitor module 230 sharing the same pulse transformer 248 to deactivate its corresponding H-bridge switch 206.

Additionally, when a fault condition is detected the switch controller 314 may couple a "fault out" signal via line 280 to switch controller 314 within a second control and monitor module 230, causing the second control and monitor module 230 to deactivate its subtending switch 206. The switch controller 314 may additionally or alternatively receive a "fault in" signal from the second control and monitor module 230 via line 282, indicating that the second control and monitor module 230 has identified a fault condition and causing the switch controller 314 to turn off its subtending switch 206.

Figure 4:
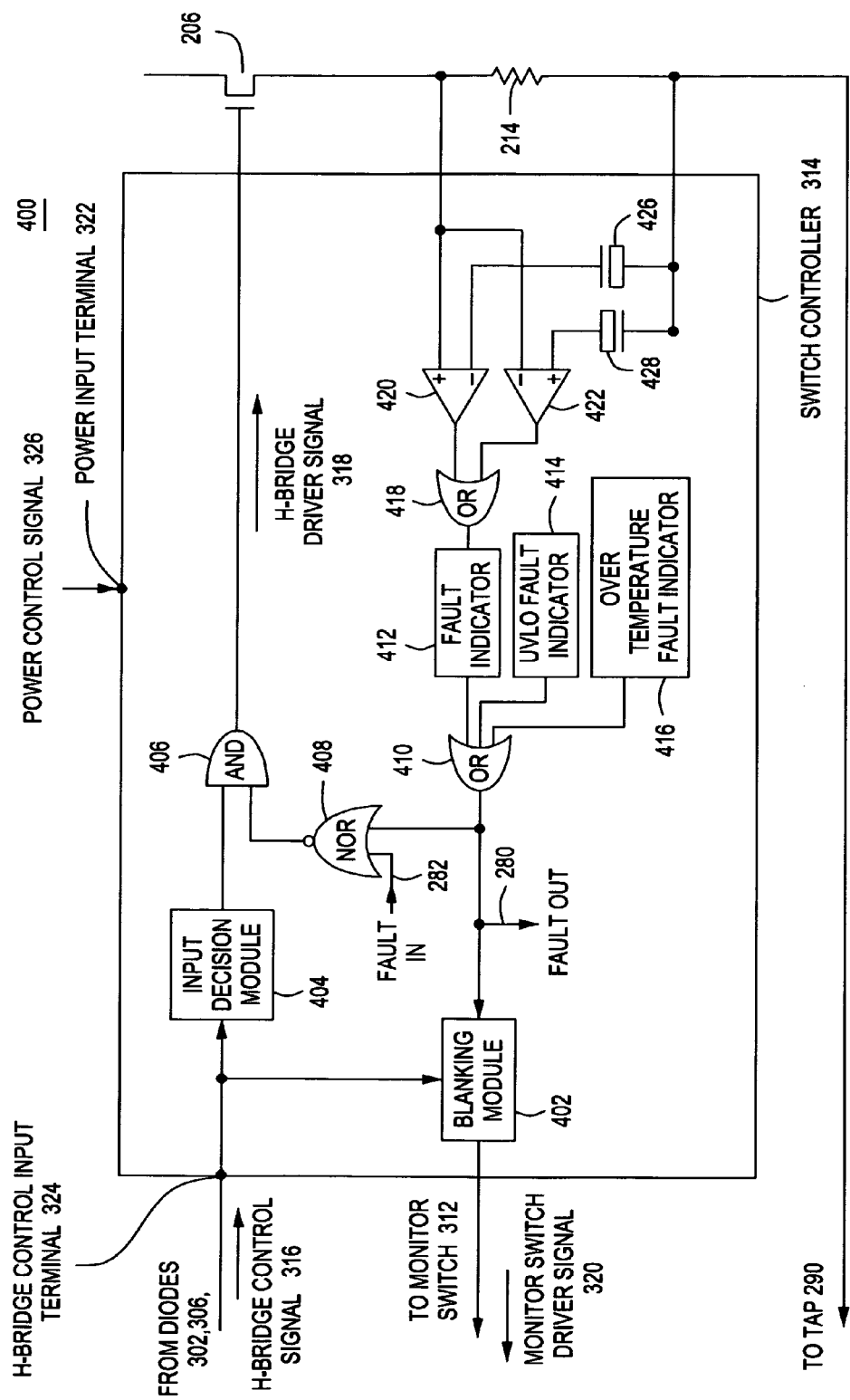
FIG. 4 is a schematic diagram of a switch controller in accordance with one or more embodiments of the present invention.

FIG. 4 is a schematic diagram of a switch controller 314 in accordance with one or more embodiments of the present invention. The switch controller 314 comprises a blanking module 402 and an input decision module 404, each coupled to the H-bridge control input terminal 324 for receiving the H-bridge control signal 316. The input decision module 404 is further coupled to a first input of a logical AND gate 406, and the AND gate 406 receives a second input from a logical NOR gate 408. The AND gate 406 generates the H-bridge driver signal 318 and couples such signal to the gate terminal of the switch 206 for driving the switch 206.

The switch controller 314 further comprises reference voltages 426 and 428, each coupled to the second terminal of the resistor 214. The reference voltages 426 and 428 are further coupled to an inverting input of a comparator 420 and a non-inverting input of a comparator 422, respectively. A non-inverting input of the comparator 420 and an inverting input of the comparator 422 are coupled to the source terminal of switch 206. Outputs from the comparators 420 and 422 are coupled to a first and a second input of a logical OR gate 418, respectively, and an output from the OR gate 418 is coupled to an input of a fault indicator 412. In some embodiments, the fault indicator 412 comprises a monostable circuit or similar circuitry that generates a high signal output in response to receiving a high signal input.

An output of the fault indicator 412 is coupled to a first input of a logical OR gate 410, and an output of the OR gate 410 is coupled to an input of the NOR gate 408. In some embodiments, one or more additional fault indicator circuits, such as under-voltage lockout (UVLO) fault indicator 414 and/or over-temperature fault indicator 416, may be coupled to additional inputs of the OR gate 410. In such embodiments, the UVLO fault indicator 414 indicates a fault (e.g., by generating a high output) when the voltage across the capacitor 310/switch controller 314 is insufficient for proper operation. The over-temperature fault indicator 416 indicates a fault (e.g., by generating a high output) when the controller temperature or the switch temperature satisfies a threshold; for example, a temperature sensor may be co-located with the switch 312 within the control and monitor module 230 for indicating the switch temperature. In some alternative embodiments, the OR gate 410 is omitted from the switch controller 314 and the output from the fault indicator 412 is coupled to the input of the NOR gate 408. The output of the OR gate 410 is further coupled to the blanking module 402 for driving the blanking module 402.

The blanking module 402 generates the monitor switch driver signal 320 based on the received H-bridge switch signal 316 and the signal from the OR gate 410; the blanking module 402 then couples the monitor switch driver signal 320 to the gate terminal of the monitor switch 312 for driving the monitor switch 312. When receiving a low-signal from the OR gate 410, the blanking module 402 generates the monitor switch driver signal 320 as a low-signal that deactivates the monitor switch 312, leaving the received H-bridge control signal 316 unaltered. When receiving a high signal from the OR gate 410, the blanking module 402 "blanks-out" a portion of the duty cycle of the H-bridge control signal 316 by generating a monitor switch driver signal 320 that activates the monitor switch 312 after a portion of the H-bridge control signal period and deactivates the monitor switch 312 at the end of each H-bridge control signal period. In some embodiments, the monitor switch 312 is activated after 25% of the period of the H-bridge control signal 316.

In addition to controlling the blanking module 402, the output from the OR gate 410 provides an indication of a detected fault to the first input of the NOR gate 408. In some embodiments, the output from the OR gate 410 may be further coupled via line 280 to a second switch controller 314 for indicating a detected fault ("fault out"). Additionally or alternatively, a second input to the NOR gate 408 may be coupled via line 282 to a second switch controller 314 for receiving an indication of a fault detected by the second switch controller 314 ("fault in"). In some alternative embodiments, the second input to the NOR gate 408 may be tied to a logic zero, or the NOR gate 408 may be omitted and an inverted output from the OR gate 410 coupled to the AND gate 406.

The input decision module 404 generates an output signal based on the received H-bridge control signal 316. In some embodiments, the input decision module 404 generates the output signal based on the duty cycle of the H-bridge control signal 316 at a given time; for example, the input decision module 404 may generate a high signal output when the switch control signal duty cycle is greater than 50% and a low-signal output when the H-bridge control signal duty cycle is less than 50%. The input decision module 404 may comprise a monostable circuit for providing such output signals; alternatively, a phase locked loop may be utilized, the signal may be averaged over one period and the averaged value compared to one-half of the supply voltage, or a similar technique may be utilized.

During normal operating conditions (i.e. no fault conditions), all inputs to the OR gate 410 are low, as well as the fault in signal on line 282. The output from the NOR gate 408 is thus a high signal to the AND gate 406, and the output from the AND gate 406 (i.e., the H-bridge driver signal 318) is determined based on the signal from the input decision module 404. When the input decision module 404 generates a high signal, the H-bridge driver signal 318 is high and the switch 206 is activated; when the input decision module 404 generates a low-signal, the H-bridge driver signal 318 is low and the switch 206 is deactivated. Also during normal operating conditions, the OR gate 410 provides a low-signal to the blanking module 402, causing the blanking module 402 to generate the monitor switch driver signal 320 as a low-signal for maintaining the monitor switch 312 in an off-state.

In the event of a fault condition, such as an overcurrent fault, a negative current fault, a UVLO fault, or an over-temperature fault, the OR gate 410 receives a high signal from the fault indicator 412, the UVLO fault indicator 414, or the over temperature fault indicator 416. In the event of excessive current through the switch 206, i.e. an over-current fault, the comparator 420 provides a high signal to the OR gate 418, causing the fault indicator 412 to couple a high signal to the OR gate 410. A threshold for determining the overcurrent fault can be set by adjusting the reference voltage 426. In the event of a large negative current through the switch 206, the comparator 422 provides a high signal to the OR gate 418, causing the fault indicator 412 to couple a high signal to the OR gate 410. A threshold for determining the negative current fault can be set by adjusting the reference voltage 428. In the event of a UVLO fault, the UVLO fault indicator 414 detects the fault and couples a high signal to the OR gate 410, and in the event of an over-temperature fault, the over-temperature fault indicator 416 detects the fault and couples a high signal to the OR gate 410.

In response to the received high signal, the OR gate 410 couples a high signal to the NOR gate 408, which in turn couples a low-signal to the AND gate 406. Additionally or alternatively, the NOR gate may receive a high signal input via the line 282, resulting in a low-signal to the AND gate 406. Upon receiving the low-signal, the AND gate 406 generates a low H-bridge driver signal 318 that deactivates the switch 206.

In addition to coupling the high signal to the NOR gate 408 during a detected fault condition, the OR gate 410 couples the high signal to the blanking module 402. Upon receiving a high signal from the OR gate 410, the blanking module 402 generates a periodic monitor switch driver signal 320 that becomes high after a first portion of the period of the H-bridge control signal 316 (i.e., the monitor switch 312 is activated) and becomes low at the end of the H-bridge control signal period (i.e., the monitor switch 312 is deactivated). Such activation/deactivation of the monitor switch 312 "blanks-out" the duty cycle of the H-bridge control signal 316 and the DC/AC conversion control signal 201 after the first portion; in some embodiments, the monitor switch 312 is turned on after 25% of the period of the H-bridge control signal 316. Such blanking of the H-bridge control signal 316 and the DC/AC conversion control signal 201 provides an indication of the detected fault to the main controller 106 via the pulse transformer 248, thereby communicating the detected fault to the main controller 106 via the same communication path utilized to communicate the DC/AC conversion control signal 201 for operating the H-bridge during the DC/AC power conversion.

Figure 5:
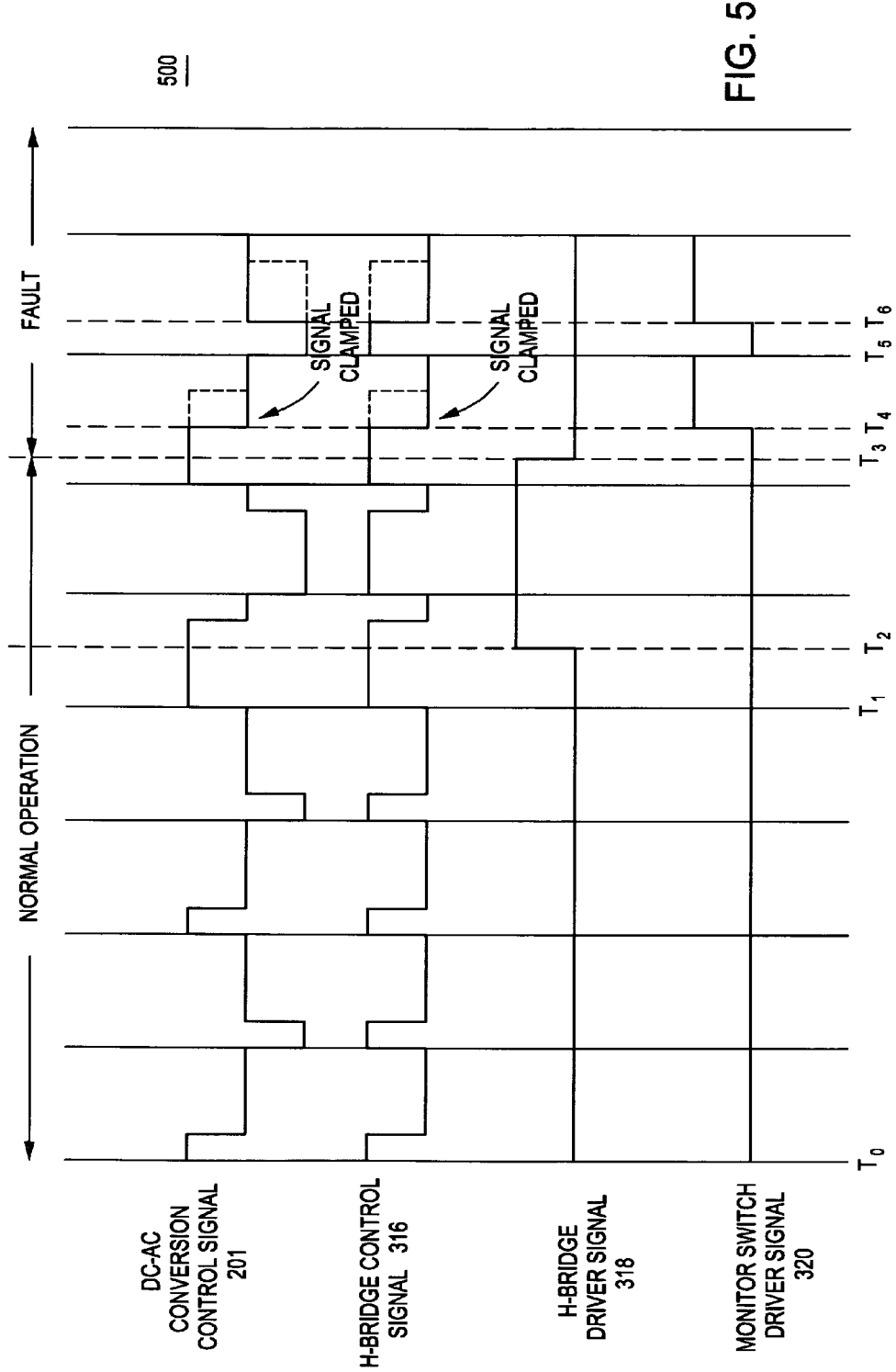
FIG. 5 is a plurality of waveforms depicting DC/AC inversion stage control and monitoring signals in accordance with one or more embodiments of the present invention.

FIG. 5 is a plurality of waveforms 500 depicting DC/AC inversion stage control and monitoring signals in accordance with one or more embodiments of the present invention. The waveforms 500 comprise a DC/AC conversion control signal 201, an H-bridge control signal 316, an H-bridge driver signal 318, and a monitor switch driver signal 320.

From time $T_0$ to $T_1$, during a period of normal operating conditions (i.e., no faults detected), the DC/AC conversion control signal 201 comprises a series of periodic dual-polarity pulses having a 25% duty cycle; in other embodiments, the DC/AC conversion control signal 201 may have a different duty cycle. The DC/AC conversion control signal 201 is generally a high-frequency signal, for example on the order of megahertz. The dual-polarity DC/AC conversion control signal pulses are rectified by the diodes 302 and 306, as described above with respect to FIG. 3, to generate the H-bridge control signal 316.

In accordance with the duty cycle of the H-bridge control signal 316, the input decision module 404 generates a low H-bridge driver signal 318 and the switch 206 is deactivated. Additionally, as a result of no detected faults, the blanking module 402 generates a low monitor switch driver signal 320 and the monitor switch 312 is deactivated.

At time $T_1$, the DC/AC conversion control signal 201 becomes a series of periodic dual-polarity pulses having a larger duty cycle than the previous DC/AC conversion control signal pulses, such as a 75% duty cycle, resulting in an H-bridge control signal 316 that also has a larger duty cycle than the previous H-bridge control signal pulses (i.e., the H-bridge control signal duty cycle is the same as the DC/AC conversion control signal duty cycle). The H-bridge driver signal 318 and the monitor switch driver signal 320 remain low.

At time $T_2$, the input decision module 404 has determined that the duty cycle of the H-bridge control signal 316 is sufficient to activate the switch 206. Accordingly, the input decision module 404 generates a high output signal, resulting in a high H-bridge driver signal 318 that activates the switch 206. In some embodiments, the input decision module 404 may generate the output signal when the switch control signal 316 has reached 50% of its period; in other embodiments, the input decision module 404 may generate the output signal before or after 50% of the switch control signal period. The blanking module 402 continues to generate a low monitor switch driver signal 320 and the monitor switch 312 remains deactivated.

At time $T_3$, while the switch 206 is activated, a fault condition is detected. Such a fault condition may be one or more of, for example, an overcurrent through the switch 206, a negative current through the switch 206, an under-voltage lockout (UVLO) fault, or an over-temperature fault. As a result of the detected fault, the OR gate 410 couples a high signal to the NOR gate 408; additionally or alternatively, the NOR gate 408 may received a "fault in" signal from another switch controller 314. The high input or inputs to the NOR gate 408 causes the NOR gate 408 to couple a low signal to the AND gate 406, resulting in a low H-bridge driver signal 318 that deactivates the switch 206. Upon deactivation, current flow through the switch 206 ceases, thereby preventing any damage to the switch 206 from the detected fault.

The monitor switch driver signal 320 remains low at time $T_3$. The high output from the OR gate 410 is coupled to the blanking module 402 and is further coupled as a "fault out" signal to a second switch controller 314.

The high output from the OR gate 410 causes the blanking module 402 to generate a monitor switch driver signal 320 that becomes high at $T_4$ (i.e., at one quarter of the period of the H-bridge control signal 316), activating the monitor switch 312 and shorting the H-bridge control signal 316. The DC/AC conversion control signal 201 and the H-bridge control signal 316 become low (i.e., the signals are clamped). The H-bridge driver signal 318 remains low. In other embodiments, the blanking module 402 may generate a monitor switch driver signal 320 that becomes high at a different point in the H-bridge driver signal period.

At time $T_5$, i.e., at the end of the period of the H-bridge control signal 316, the blanking module 402 generates a low monitor switch driver signal 320, deactivating the monitor switch 312. The DC/AC conversion control signal 201 becomes high at a negative polarity, the H-bridge control signal 316 becomes high, and the H-bridge driver signal 318 remains low. At time $T_6$, i.e., at one quarter of the period of the H-bridge control signal 316, the blanking module 402 generates a high monitor switch driver signal 320, activating the monitor switch 312 and shorting the H-bridge control signal 316. The DC/AC conversion control signal 201 and the H-bridge control signal 316 become low (i.e., the signals are clamped), while the H-bridge driver signal 318 remains low.

The monitor switch 312 is thus activated and deactivated upon detection of a fault to clamp the H-bridge control signal 316 and the DC/AC conversion control signal 201 at a reduced duty cycle. Such clamping of the H-bridge control signal 316 and the DC/AC conversion control signal 201 causes another control and monitor module 230 that shares the same pulse transformer 248 to switch off its corresponding H-bridge switch 206. Additionally, the clamping of the H-bridge control signal 316 and the DC/AC conversion control signal 201 provides an indication of the detected fault to the main controller 106 via the pulse transformer 248, thereby communicating the detected fault to the main controller 106 on the same communication path utilized to communicate the control signals for operating the H-bridge during the DC/AC power conversion. The main controller 106 may then deactivate operation of the entire H-bridge to prevent any potential damage to the H-bridge.

Figure 6:
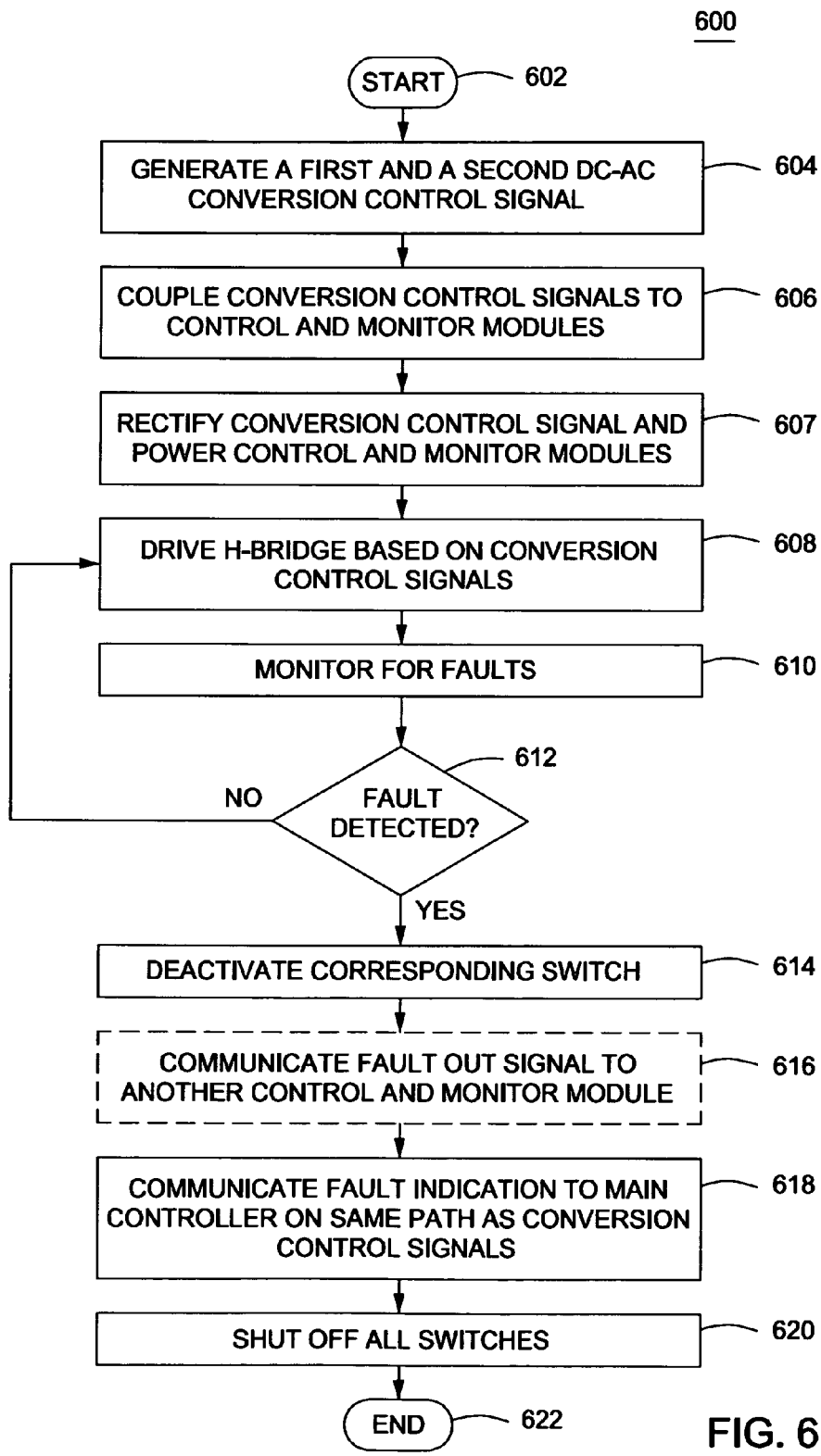
FIG. 6 is a flow diagram of a method for controlling and monitoring an H-bridge in accordance with one or more embodiments of the present invention.

FIG. 6 is a flow diagram of a method 600 for controlling and monitoring an H-bridge in accordance with one or more embodiments of the present invention. In some embodiments, such as the embodiment described below, the H-bridge receives a DC input waveform and converts the DC input waveform to an AC output waveform in accordance with DC/AC conversion control signals received from a main controller, where each switch within the H-bridge is coupled to a separate control and monitor module for controlling the activation/deactivation of the switches (e.g., switches 206 coupled to control and monitor modules 230). In some embodiments, the control and monitor modules 230 are low-voltage integrated circuits (ICs).

The method 600 starts at step 602 and proceeds to step 604. At step 604, first and second DC/AC conversion control signals (e.g., DC/AC conversion control signals $201_1$ and $201_2$) are generated by the main controller. The first and second DC/AC conversion control signals control the operation (i.e., the sequential switching) of a first diagonal switch pair ("first diagonal") and a second diagonal switch pair ("second diagonal") of the H-bridge, respectively, for converting the DC input waveform to the AC output waveform. In some embodiments, the first and second DC/AC conversion control signals each comprise a series of periodic high-frequency (i.e., megahertz) dual-polarity pulses of differing duty cycles for indicating whether the diagonals of the H-bridge switch should be activated or deactivated. For example, the DC/AC conversion control signal may consist of a series of pulses having a first duty cycle for indicating that a diagonal should be deactivated, followed by a series of pulses having a second duty cycle for indicating that the diagonal should be activated. In some embodiments, the first and second duty cycles are 25% and 75%, respectively; alternatively, other values may be utilized for the first and/or the second duty cycle.

The method 600 proceeds to step 606, where the first DC/AC conversion control signal is coupled to the first diagonal via a first pulse transformer (e.g., pulse transformer $248_1$) and the second DC/AC conversion control signal is coupled to the second diagonal via a second pulse transformer (e.g., pulse transformer $248_2$). In some embodiments, each pulse transformer comprises two identical secondary windings for coupling the first DC/AC conversion control signal to different control and monitor modules within a diagonal. The secondary windings are generally such that the magnitude of the DC/AC conversion control signal is stepped-up on the secondary side of the pulse transformer; for example, a step-up may be required to increase from 3.3V logic to 10V for operating a MOSFET switch. In some alternative embodiments, the secondary windings may be such that no change in voltage level occurs or the voltage level is stepped-down on the secondary side of the pulse transformer. In some embodiments, each of the secondary windings may comprise a tap coupled to the corresponding control and monitor modules.

The method 600 proceeds to step 607. At the input of each control and monitor module, the received dual-polarity DC/AC conversion control signal is rectified is generate an H-bridge control signal for operating the corresponding H-bridge switch (e.g., H-bridge control signal 316). In addition to controlling the operation of the H-bridge switch, the H-bridge control signal powers the control and monitor module; e.g., the control and monitor module may comprise a capacitor that forms a DC power source. The method 600 proceeds to step 608, where the H-bridge is operated in accordance with the H-bridge control signals at each control and monitor module. In some embodiments, the duty cycle of the H-bridge control signal indicates whether a corresponding switch should be activated or deactivated. For example, an H-bridge control signal having a 75% duty cycle may indicate that the corresponding switch should be activated, while a 25% duty cycle may indicate that the corresponding switch should be deactivated.

The control and monitor module generates an H-bridge driver signal (e.g., H-bridge driver signal 318) for driving the corresponding switch based on the duty cycle of the H-bridge control signal. The H-bridge driver signal is generally delayed with respect to the H-bridge control signal in order for the control and monitor module to assess the H-bridge control signal duty cycle and determine the appropriate output. For example, the control and monitor module may generate the H-bridge driver signal at 50% of the H-bridge control signal period.

At step 610, the H-bridge switches are monitored for faults. Each control and monitor module monitors its corresponding switch for one or more fault conditions, such as an overcurrent fault (i.e., current level too high through the switch), a negative current fault (i.e., negative current through the switch), or the like. In some embodiments, the control and monitor modules may monitor for additional fault conditions as well, such as under-voltage lockout (UVLO), over-temperature faults, or the like.

At step 612, a determination is made as to whether any faults have been detected. If no faults have been detected by the control and monitor modules, the method 600 returns to step 608. If, at step 612, a fault has been detected by at least one control and monitor module, the method 600 proceeds to step 614.

At step 614, the control and monitor module detecting the fault generates an H-bridge driver signal to deactivate the subtending switches. In some embodiments, at step 616, a control and monitor module detecting the fault may also trigger a control and monitor module within another diagonal to deactivate its subtending switch; for example, the control and monitor module may couple a "fault out" signal to the second control and monitor module (e.g., the fault out signal on line 280), causing the second control and monitor module to generate an H-bridge driver signal that deactivates its corresponding switch.

The method 600 proceeds to step 618. At step 618, the control and monitor module detecting the fault communicates a fault indication to the main controller on the same communication path that the DC/AC conversion control signals were received on. In some embodiments, the fault indication is generated by "clamping" both the H-bridge control signal and the corresponding DC/AC conversion control signal at reduced duty cycles, as described above. Such clamping of the switch control signal and the DC/AC conversion control signal communicates the fault indication to the main controller via the pulse transformer (i.e., via the same communication path utilized to communicate the control signals for operating the H-bridge during the DC/AC power conversion). Additionally, the clamping of the switch control signal and the DC/AC conversion control signal causes another control and monitor module sharing the same pulse transformer to switch off its corresponding switch.

The method 600 proceeds to step 620, where the main controller, in response to the fault indication, causes the H-bridge to shut down all switches. The method 600 then proceeds to step 622 where it ends.

Figure 7:
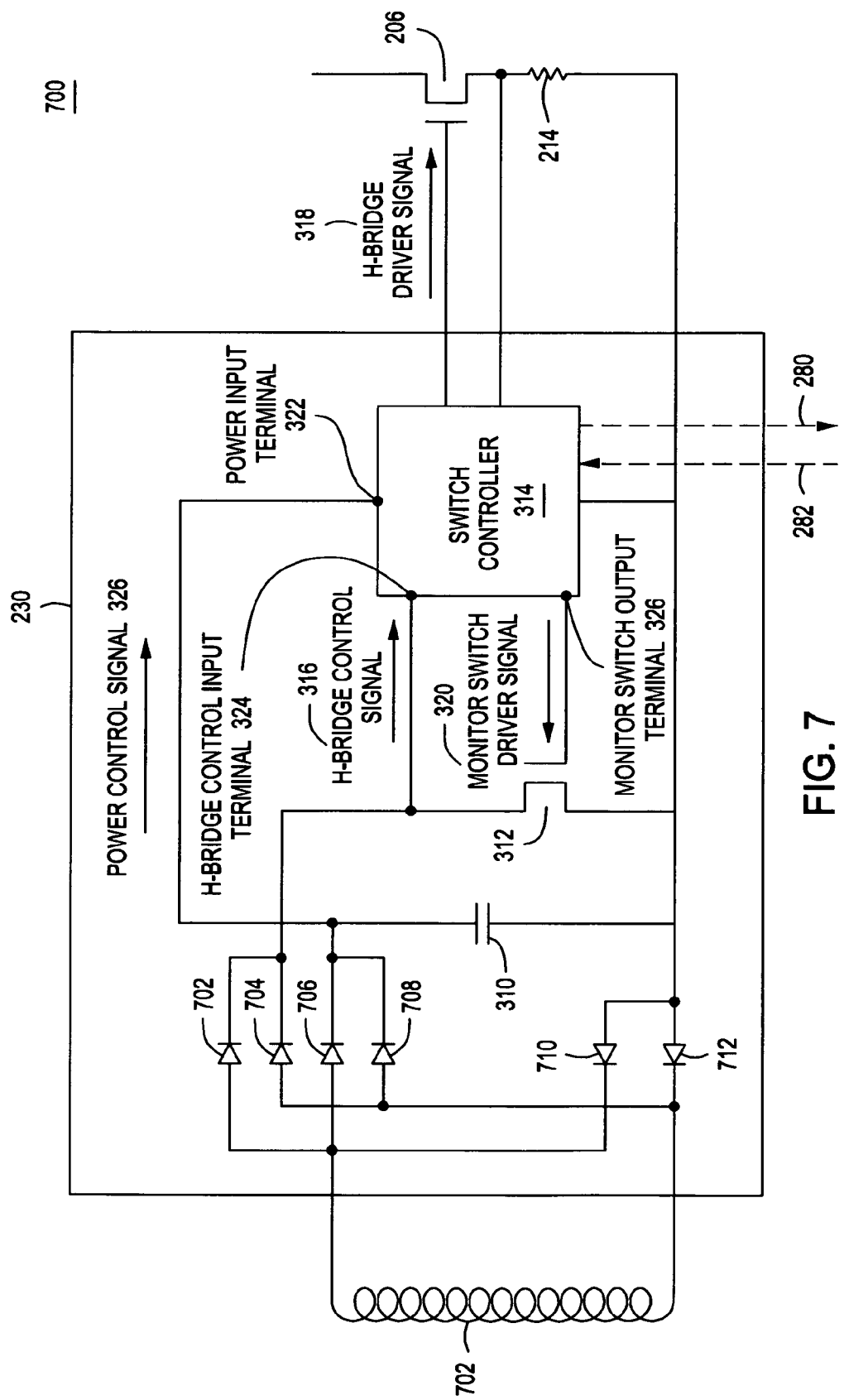
FIG. 7 is a schematic diagram of a control and monitor module coupled to a single winding secondary coil in accordance with one or more embodiments of the present invention.

FIG. 7 is a schematic diagram of a control and monitor module 730 coupled to a single-winding secondary coil 702 in accordance with one or more embodiments of the present invention. The control and monitor module 730 comprises diodes 702, 704, 706, 708, 710, and 712, input capacitor 310, monitor switch 312, and switch controller 314.

A first terminal of the single-winding secondary coil 702 is coupled to an anode terminal of the diode 702, an anode terminal of the diode 706, and a cathode terminal of the diode 710. A second terminal of the single-winding secondary coil 702 is coupled to an anode terminal of the diode 704, an anode terminal of the diode 708, and a cathode terminal of the diode 712. Cathode terminals of the diodes 702 and 704 are coupled to the drain terminal of the monitor switch 312, cathode terminals of the diodes 706 and 708 are coupled to the first terminal of the input capacitor 310 and the power input terminal 322, and anode terminals of the diodes 710 and 712 are coupled to the second terminal of the capacitor 310, the source terminal of the monitor switch 312, and the switch controller 314.

Analogous to the control and monitor module 230, the monitor switch drain and gate terminals are coupled to the H-bridge control input terminal 324 and the monitor switch output terminal 330, respectively, and the switch controller 314 is coupled via two output terminals to the switch 206 (i.e., to the gate and source terminals). The operation of the control and monitor module 230 remains the same as described with respect to FIG. 3; i.e., the received DC/AC conversion control signal 201 is rectified to generate the power control signal 326 at the power input terminal 322 and the H-bridge control signal 316 at the H-bridge control input terminal 324, the switch controller 314 provides the monitor switch driver signal 320 at the gate terminal of the monitor switch 312, and the switch controller 314 provides the H-bridge driver signal 318 at the gate terminal of the H-bridge switch 206.

While the foregoing is directed to embodiments of the present invention, other and further embodiments of the invention may be devised without departing from the basic scope thereof, and the scope thereof is determined by the claims that follow.

The invention claimed is:

1. An apparatus for controlling and monitoring an H-bridge via a single communication path, comprising:
a first control and monitor module coupled to a first switch within the H-bridge; and
a first pulse transformer coupled to (a) the first control and monitor module and (b) a first control signal to the first control and monitor module, wherein the first control and monitor module (i) generates, based on the first control signal, a first driver signal for operating the first switch of the H-bridge during DC/AC power conversion, (ii) monitors at least a portion of the H-bridge for at least one fault, and (iii) communicates, upon detecting the at least one fault, a first fault indication to a main controller of the H-bridge via the first pulse transformer.

2. The apparatus of claim 1, wherein the first driver signal is based on a duty cycle of the first control signal.

3. The apparatus of claim 1, wherein, upon detecting the at least one fault, the first control and monitor module deactivates the first switch.

4. The apparatus of claim 1, wherein the first control signal provides power for operating the first control and monitor module.

5. The apparatus of claim 1, wherein, upon detecting the at least one fault, the first control and monitor module communicates a second fault indication to a second control and monitor module for deactivating a second switch within the H-bridge.

6. The apparatus of claim 1, wherein the first control and monitor module clamps the first control signal at a shorter duty cycle to generate the first fault indication.

7. The apparatus of claim 5, wherein the main controller deactivates the H-bridge subsequent to receiving the first fault indication.

8. A method for controlling and monitoring an H-bridge via a single communication path, comprising:
transmitting, via a first pulse transformer, a first control signal;
generating, based on the first control signal, a first driver signal for operating a first switch within an H-bridge during DC/AC power conversion;
monitoring at least a portion of the H-bridge for at least one fault during the DC/AC power conversion; and
communicating, upon detecting the at least one fault, a first fault indication to a main controller of the H-bridge via the first pulse transformer.

9. The method of claim 8, wherein the first driver signal is based on a duty cycle of the first control signal.

10. The method of claim 8, further comprising deactivating, upon detecting the at least one fault, the first switch.

11. The method of claim 8, further comprising powering a control and monitor module by the first control signal, wherein the control and monitor module generates the first driver signal, monitors the at least a portion of the H-bridge, and communicates the first fault indication.

12. The method of claim 11, further comprising communicating, upon detecting the at least one fault, a second fault indication to a second control and monitor module for deactivating a second switch within the H-bridge.

13. The method of claim 8, wherein communicating the first fault indication comprises clamping the first control signal at a reduced duty cycle to generate the first fault indication.

14. The method of claim 8, further comprising deactivating the H-bridge subsequent to the main controller receiving the first fault indication.

15. A system for converting DC power to AC power, comprising:
an H-bridge, comprising a first, a second, a third, and a fourth switch, wherein the first switch is coupled to a first control and monitor module, the second switch is coupled to a second control and monitor module, the third switch is coupled to a third control and monitor module, and the fourth switch is coupled to a fourth control and monitor module;

a first pulse transformer coupled to (a) the first and the third control and monitor modules and (b) a first control signal to the first and the third control and monitor modules; and a second pulse transformer coupled to (c) the second and the fourth control and monitor modules and (d) to a second control signal to the second and the fourth control and monitor modules;

wherein (A) the first control and monitor module (i) generates, based on the first control signal, a first driver signal for operating the first switch during DC/AC power conversion, (ii) monitors at least a first portion of the H-bridge for a first fault, and (iii) upon detecting the first fault, communicates a first fault indication to a main controller via the first pulse transformer;

(B) the second control and monitor module (i) generates, based on the second control signal, a second driver signal for operating the second switch during the DC/AC power conversion, (ii) monitors at least a second portion of the H-bridge for a second fault, and (iii) upon detecting the second fault, communicates a second fault indication to the main controller via the second pulse transformer;

(C) the third control and monitor module (i) generates, based on the first control signal, a third driver signal for operating the third switch during the DC/AC power conversion, (ii) monitors at least a third portion of the H-bridge for a third fault, and (iii) upon detecting the third fault, communicates a third fault indication to the main controller via the first pulse transformer; and (D) the fourth control and monitor module (i) generates, based on the second control signal, a fourth driver signal for operating the fourth switch during the DC/AC power conversion, (ii) monitors at least a fourth portion of the H-bridge for a fourth fault, and (iii) upon detecting the fourth fault, communicates a fourth fault indication to the main controller via the second pulse transformer.

16. The system of claim 15, wherein the first and the third driver signals are based on a first control signal duty cycle, and the second and the fourth driver signals are based on a second control signal duty cycle.

17. The system of claim 15, wherein the first control signal provides power for operating the first and the third control and monitor modules, and the second control signal provides power for operating the second and the fourth control and monitor modules.

18. The system of claim 15, wherein the third control and monitor module is coupled to the fourth control and monitor module, and wherein (i) the third control and monitor module is further adapted for communicating, upon detecting the third fault, a fifth fault indication to the fourth control and monitor module; and (ii) the fourth control and monitor module is further adapted for communicating, upon detecting the fourth fault, a fifth fault indication to the third control and monitor module.

19. The system of claim 15, wherein the first control and monitor module clamps the first control signal at a first reduced duty cycle to generate the first fault indication, the second control and monitor module clamps the second control signal at a second reduced duty cycle to generate the second fault indication, the third control and monitor module clamps the first control signal at a third reduced duty cycle to generate the third fault indication, and the fourth control and monitor module clamps the second control signal at a fourth reduced duty cycle to generate the fourth fault indication.

20. The apparatus of claim 15, wherein the main controller deactivates the H-bridge subsequent to receiving at least one of the first, the second, the third, or the fourth fault indication.

* * * * *